United States Patent
Ogasawara (10) Patent No.: US 6,948,376 B2
(45) Date of Patent: Sep. 27, 2005

(54) WORK TRANSFERRING AND TRANSPORTING APPARATUS AND WORK TRANSFERRING AND TRANSPORTING METHOD

(75) Inventor: Fukashi Ogasawara, Ota-ku (JP)

(73) Assignee: Tokyo Weld Co., Ltd., Tokyo (JP)

( * ) Notice: Subject to any disclaimer, the term of this patent is extended or adjusted under 35 U.S.C. 154(b) by 99 days.

(21) Appl. No.: 10/743,769

(22) Filed: Dec. 24, 2003

(65) Prior Publication Data

US 2004/0151569 A1 Aug. 5, 2004

(30) Foreign Application Priority Data

Aug. 13, 2002 (JP) ........................................ 2002-235846

(51) Int. Cl.⁷ ............................................... G01L 7/00
(52) U.S. Cl. ......................................................... 73/756
(58) Field of Search ................... 73/700–756

(56) References Cited

FOREIGN PATENT DOCUMENTS

| JP | 10-74673 | 3/1998 |
|---|---|---|
| JP | 11-268824 | 10/1999 |

*Primary Examiner*—William Oen
*Assistant Examiner*—Jermaine Jenkins
(74) *Attorney, Agent, or Firm*—Leydig, Voit & Mayer, Ltd.

(57) ABSTRACT

A work transferring and transporting apparatus has a plurality of transportation tables. A plurality of work holders for holding works are formed on the respective peripheral edge portions of the transportation tables. Each work is transferred between each pair of adjacent transportation tables and transported. A work transfer section is provided between the adjacent transportation tables. The adjacent transportation tables continuously rotate in synchronism with each other. In the work transfer section, the work having so far been held in one of the work holders of the one transportation table is transferred to one of the work holders of the other transportation table.

14 Claims, 4 Drawing Sheets

WORK TRANSFERRING AND TRANSPORTING APPARATUS AND WORK TRANSFERRING AND TRANSPORTING METHOD

BACKGROUND OF THE INVENTION

1. Field of the Invention

The present invention relates to an apparatus and a method for transferring works, such as chip-type electronic components, from one transportation table to another transportation table and transporting them while carrying out various processes, such as measurement of their electrical properties, sorting, etc., and more particularly, to a work transferring and transporting apparatus and a work transferring and transporting method, capable of coping with the trend toward higher-speed transportation between a plurality of transportation tables and suited for inspection of the external appearance of works.

2. Description of the Related Art

An apparatus for transferring and transporting chip-type electronic components or the like is described in Jpn. Pat. Appln. KOKAI Publication No. 10-74673, for example. This prior art apparatus is constructed in the manner shown in FIG. 5. This work transferring and transporting apparatus 20 comprises a first transportation table 21 and a second transportation table 22 having axes of rotation that extend at right angles to each other. A plurality of work storage recesses 23 and 24 are formed in the respective outer peripheral edge portions of the transportation tables 21 and 22 so as to be arranged at regular pitches in the circumferential direction.

Figure 5:
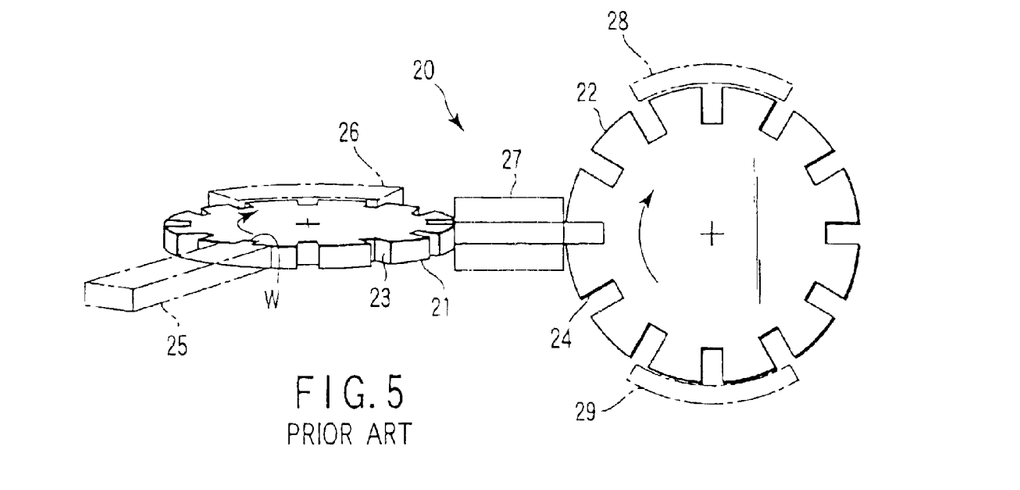
FIG. 5 is a perspective view showing an outline of a conventional transferring and transporting apparatus.

Divided work supply means 25 is located near the first transportation table 21. Works W that are supplied from the supply means 25 are trapped one after another into the work storage recesses 23 of the first transportation table 21 that rotates intermittently. The works W are subjected to external inspection or measurement of electrical properties in a first processor 26 as they are transported by means of the intermittently rotating table 21. Those works W which are then concluded to be defective or nonstandard are discharged in the first processor 26.

Those works which are concluded to be nondefective in the first processor 26 are transferred to the work storage recess 24 of the second transportation table 22 by means of a work transferring means 27. The first and second transportation tables 21 and 22 intermittently rotate in a separate manner and temporarily stop with their respective work storage recesses 23 and 24 opposed to each other. The works W undergo inspection and the like in a second processor 28 as they are transported by means of the second transportation table 22 that rotates intermittently.

External inspection of the surfaces of the works W that is complementary to the inspection in the first processor 26 is carried out in the second processor 28. Those works W which are checked for defectiveness in the second processor 28 are transported to a discharge section 29 by means of the second transportation table 22. Those works which are concluded to be nondefective are transported to the next stage, while those ones which are concluded to be defective or nonstandard are discharged in the discharge section 29.

In the transferring and transporting apparatus 20 constructed in this manner, the transportation tables 21 and 22 are intermittently rotated to transport the works W in the aforesaid manner. In some cases, therefore, trouble may be caused by vibration as the transportation tables 21 and 22 rotate intermittently. Further, the works W may fail to be properly transferred, owing to jamming in work transfer means 27, or the apparatus cannot cope with the trend toward higher-speed processing, due to the limited transfer speed of the work transfer means 27 or the limited rotational speed for the intermittent rotation.

Figure 6:
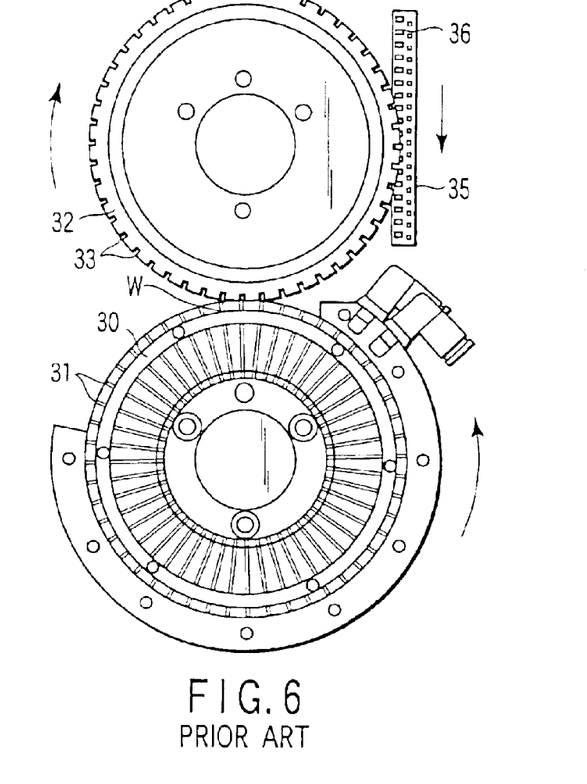
FIG. 6 is a plan view showing another conventional transferring and transporting apparatus.

In order to solve this problem of the intermittent rotation, therefore, a chip component transferring apparatus that continuously rotates transportation tables is described in Jpn. Pat. Appln. KOKAI Publication No. 11-268824. This prior art apparatus is constructed in the manner shown in FIGS. 6 and 7. FIG. 6 is a plan view of the transferring apparatus. In this transferring apparatus, a feeding disc 30 and a transporting disc 32 are arranged side by side. Cavities 31 are formed in the feeding disc 30. The peripheral edge portion of the transporting disc 32 is formed having cavities 33, which store the chip components and other works W.

The works W such as chip parts are transferred individually to the cavities 31 of the feeding disc 30. They are transported as the feeding disc 30 rotate and are transferred individually to the cavities 33 of the transporting disc 32 that adjoins the feeding disc 30. Then, the works W are transported again as the transporting disc 32 rotates and are transferred individually to cavities 36 of a carrier tape 35.

Figure 7A:
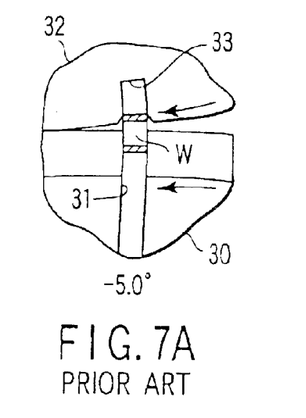
FIGS. 7A to 7C are plan views individually showing processes of operation of the transferring and transporting apparatus shown in FIG. 6.
Figure 7B:
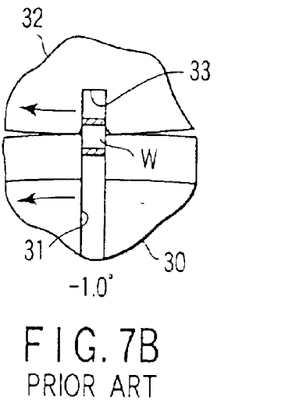
Figure 7C:
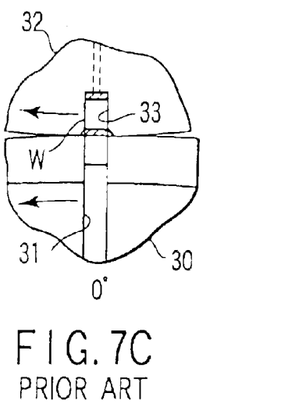

FIGS. 7A, 7B and 7C sequentially show the way a work W is transferred from the feeding disc 30 of FIG. 6 to the transporting disc 32. As shown in FIG. 7A, the work W is held in one of the cavities 31 in the outer periphery of the feeding disc 30 by air suction. The work W projects from the outer periphery of the feeding disc 30. Air suction of the feeding disc 30 is stopped when the work W is opposed to one of the cavities 33 of the transporting disc 32. At the same time, the work W is transferred to the transporting disc 32 when the cavity 33 of the transporting disc 32 is subjected to air suction.

According to this prior art, the discs 30 and 32 continuously rotate in synchronism with each other so that the cavities 31 of the feeding disc 30 successively face the cavities 33 of the transporting disc 32. However, this prior art has the following problems.

(1) The feeding disc 30 and the transporting disc 32 require high-accuracy synchronous rotation. If the synchronous rotation is subject to the slightest deviation, the works W that project from the cavities 31 may run against the outer periphery of the transporting disc 32 and break. For example, dust may collect between the cavities 31 and 33 and the works W or the air suction may fail to be switched properly, so that the works W cannot be transferred smoothly, in some cases.

As shown in FIG. 7B, for example, the works W sometimes may stop at a position intermediate between the feeding disc 30 and the transporting disc 32. If the discs 30 and 32 continue to rotate in the directions of the arrows in FIG. 7B in this state, the works W are subjected to a bending force between the cavities 31 and 33. In this case, the works W or the cavities 31 and 33 may possibly be broken.

(2) If the gaps between the cavities 31 and 33 and the works W are enlarged to solve the problem described in item (1), the works W cannot be transferred steadily. Thus, the air suction of the transporting disc 32 suffers an increased leakage, so that the sucking force for the works W lowers.

(3) The property measurement or external inspection for the works W is carried out as the works W are transported. If the gaps between the works W and the cavities 31 and 33 are too wide, the positions of the works W change, so that the measurement or inspection is liable to failure.

(4) Since the works W are transferred between the discs 30 and 32 while the feeding disc 30 and the transporting disc 32 are rotating continuously, it is hard to use a sensor. Since the discs 30 and 32 rotate continuously, moreover, they cannot be easily stopped in a moment in case of trouble. On the other hand, the transportation tables 21 and 22 shown in FIG. 5 rotate intermittently. Therefore, trouble in the works W can be detected by means of a sensor, or the tables 21 and 22 can be stopped in a moment.

According to the conventional intermittent rotation system (FIG. 5), as described above, the processing speed is low, although the operation is highly reliable. On the other hand, the continuous rotation system (FIGS. 6 and 7) lacks in reliability, although it enjoys a high processing speed.

BRIEF SUMMARY OF THE INVENTION

Accordingly, the object of the present invention is to provide a work transferring and transporting apparatus and a work transferring and transporting method, capable of securely transferring and transporting works and ensuring an increased processing speed.

According to an aspect of the invention, there is provided a work transferring and transporting apparatus which includes first and second transportation tables, having a plurality of work holders for holding works on the peripheral edge portions thereof and arranged adjacent to and substantially flush with each other, and transfers the works from the first transportation table to the second transportation table and transports the works by means of the second transportation table. The work transferring and transporting apparatus comprises a work transfer section located between the first and second transportation tables, the first and second transportation tables continuously rotate in synchronism with each other, and each work is transported by means of the second transportation table after the work, held in one of the work holders of the first transportation table, is transferred to one of the work holders of the second transportation table in the work transfer section.

According to this configuration, the first and second transportation tables rotate continuously, and the work is transferred to the work holder of the second transportation table when the work that is held in the work holder of the first transportation table is reached to the work transfer section. For example, inspection of the external appearance of the work or measurement of its electrical properties is carried out during the transportation of the work.

Since the first transportation table is rotating continuously, a moment in the same direction (e.g., counterclockwise direction) as the rotating direction of the first transportation table, as well as a centrifugal force that acts on the work, acts in the work transfer section. When the work leaves the first transportation table, therefore, it rotates in the direction of the aforesaid moment as it is transferred springing to the work holder of the second transportation table. Thus, the work can be securely transferred to cope with the trend toward higher-speed processing.

Preferably, the first and second transportation tables transfer the works from the work holders of the first transportation table located on the upper-stream side with respect to the work transporting direction to the work holders of the second transportation table on the lower-stream side.

Preferably, the first and second transportation tables rotate in opposite directions around the centers of rotation thereof so that the respective work holders of the transportation tables move in the same direction in the work transfer section.

Preferably, each work holder of the first transportation table is in the form of an L-shaped recess having surfaces capable of holding each work in a manner such that the work holder is inclined inside the transportation table at an angle greater than 0° and narrower than 45° to a line tangent to the trajectory of the transportation table on the front side with respect to the rotating direction.

Preferably, each work holder of the second transportation table is in the form of an L-shaped recess having surfaces capable of holding each work in a manner such that the work holder is inclined inside the transportation table at an angle greater than 0° and narrower than 45° to a line tangent to the trajectory of the transportation table on the rear side with respect to the rotating direction.

Preferably, the respective work holders of the first and second transportation tables are situated symmetrically with respect to a point in the work transfer section.

Preferably, a suction port connected to a negative pressure source is formed in a corner portion of the L-shaped recess of each work holder of the first transportation table.

Preferably, a suction port connected to a negative pressure source is formed in a corner portion of the L-shaped recess of each work holder of the second transportation table.

Preferably, a line which connects the center of rotation of the first transportation table and a corner portion of the L-shaped recess of the work holder of the first transportation table and a line which connects the center of rotation of the second transportation table and a corner portion of the L-shaped recess of the work holder of the second transportation table are spaced and extend parallel to each other in the work transfer section.

Preferably, the respective work holders of the first and second transportation tables are formed individually having suction ports, the suction ports being connected with a negative pressure source, which generates a negative pressure lower than the atmospheric pressure, through switching means capable of switching pressure.

An example of the switching means is a selector valve which changes pressure between the atmospheric pressure and a negative pressure lower than the atmospheric pressure. Another example of the switching means is a selector valve which changes pressure between a negative pressure lower than the atmospheric pressure and a positive pressure higher than the atmospheric pressure.

According to another aspect of the invention, there is provided a work transferring and transporting method which includes a step of attracting a work to a work holder on the peripheral edge portion of a rotating first transportation table under a negative pressure lower than the atmospheric pressure and transporting the work and a step of transferring the work from the work holder of the first transportation table to a work holder of a second transportation table. The work transferring and transporting method comprises a step of canceling the negative pressure in the work holder of the first transportation table, thereby disengaging the work from the work holder of the first transportation table, in a work transfer section located between the first and second transportation tables, and a step of attracting the work disengaged from the first transportation table to the work holder of the second transportation table under a negative pressure lower than the atmospheric pressure, thereby transferring the work to the second transportation table, and transporting the work by means of the second transportation table.

Preferably, the negative pressure in the work holder of the first transportation table is canceled to allow the work disengaged from the work holder to be transferred to the work holder of the second transportation table by means of a centrifugal force generated as the first transportation table rotates.

Preferably, a positive pressure higher than the atmospheric pressure is applied to the work holder of the first transportation table when the work is disengaged from the work holder.

DETAILED DESCRIPTION OF THE INVENTION

An embodiment of the present invention will now be described with reference to FIGS. 1 to 4C.

Figure 1:
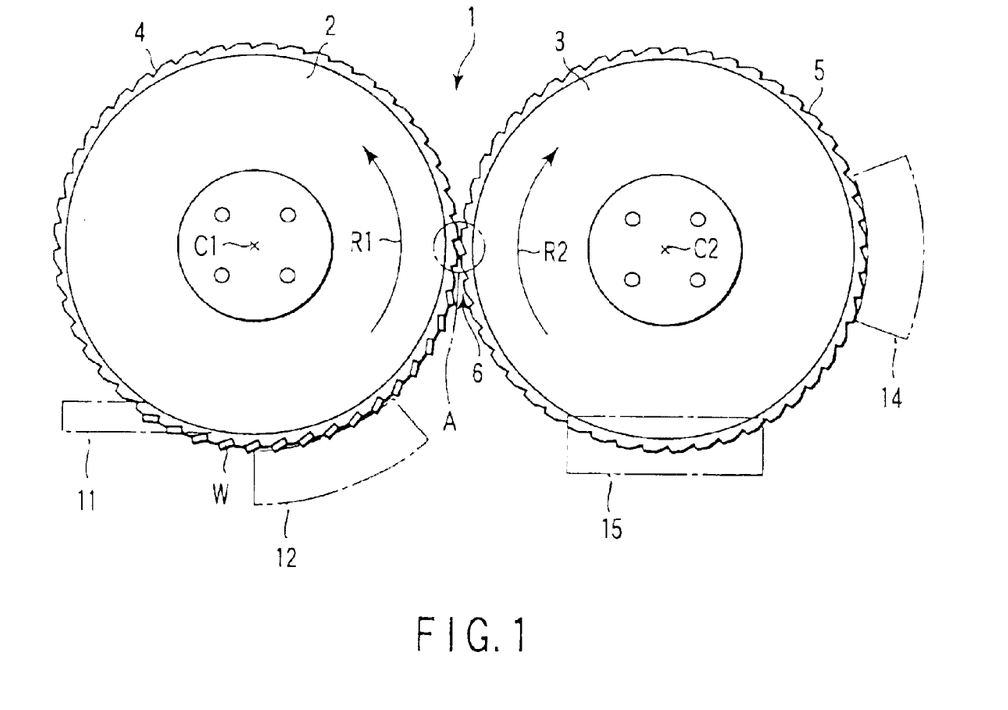
FIG. 1 is a plan view of a work transferring and transporting apparatus according to an embodiment of the invention.

As shown in FIG. 1, a work transferring and transporting apparatus 1 comprises first and second transportation tables 2 and 3, which are situated on the upper- and lower-stream sides, respectively, of transportation with respect to the transporting direction for a work W. The transportation tables 2 and 3 are arranged substantially horizontally on the same plane. The work transferring and transporting apparatus 1 may comprise another transportation table (e.g., third or fourth transportation table) besides the first and second transportation tables 2 and 3.

The first transportation table 2 is in the form of a disc that can continuously rotate in the direction indicated by arrow R1 around a center C1 of rotation. A plurality of work holders 4 are arranged at regular pitches in the circumferential direction on the outer peripheral edge of the first transportation table 2. The second transportation table 3 is in the form of a disc that shares the outside diameter with the first transportation table 2 and can continuously rotate in the direction indicated by arrow R2, that is, in the direction opposite to the rotating direction of the first transportation table 2, around a center C2 of rotation. A plurality of work holders 5 are also arranged at regular pitches in the circumferential direction on the outer peripheral edge of the second transportation table 3.

The work W, an electronic component chip in the form of a cube or rectangular parallelepiped, is held by means of the respective work holders 4 and 5 of the transportation tables 2 and 3. A work transfer section 6 is provided in a position between the transportation tables 2 and 3 where they are situated closest to each other. In the work transfer section 6, the transportation tables 2 and 3 adjoin each other on the same plane so that they can transfer each work W from one of the work holders 4 to one of the work holders 5. A guide member (not shown) underlies the work transfer section 6 so that the work W can slide in horizontal direction.

Figure 2:
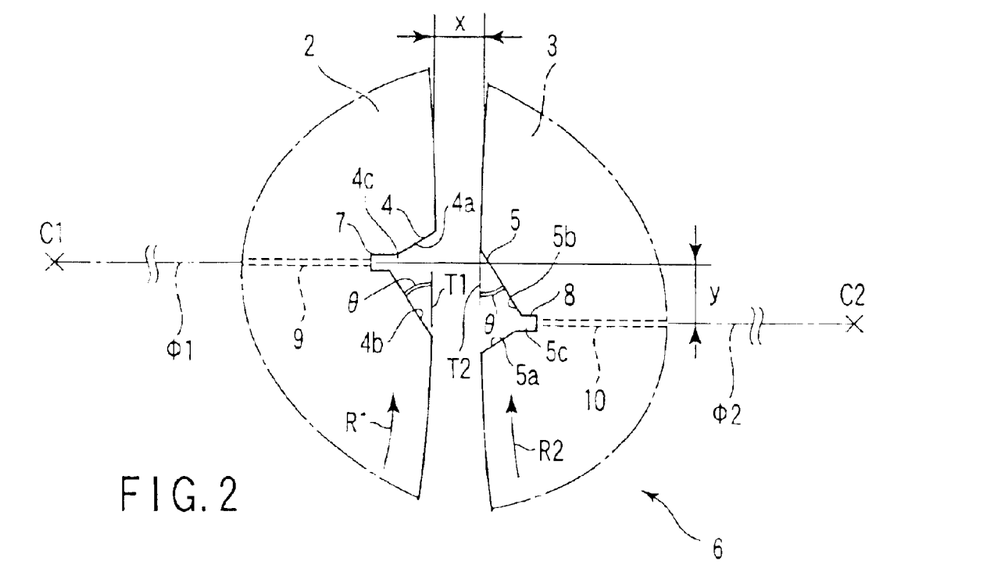
FIG. 2 is an enlarged plan view of a part of the work transferring and transporting apparatus showing a section A of FIG. 1.

As shown in FIG. 2, the one work holder 4 is in the form of an L having a short side 4a and a long side 4b that extend at right angles to each other. The long side 4b is inclined inside the first transportation table 2 at an angle θ to a line T1 tangent to the trajectory of the table 2 on the front side with respect to the rotating direction. The other work holder 5 is also in the form of an L having a short side 5a and a long side 5b that extend at right angles to each other. The long side 5b is inclined inside the second transportation table 3 at the angle θ to a line T2 tangent to the trajectory of the table 3 on the rear side with respect to the rotating direction. The angle θ is wider than 0° and narrower than 45° (0°<θ<45°).

In the work transfer section 6, the respective short sides 4a and 5a of the work holders 4 and 5 extend parallel to each other. The long sides 4b and 5b also extend parallel to each other. Suction ports 7 and 8 open individually in recesses that are formed in corner portions 4c and 5c of the work holders 4 and 5, respectively. The ports 7 and 8 communicate with a negative pressure source P (schematically shown in FIG. 3) by means of suction holes 9 and 10, respectively. A solenoid selector valve V that functions as switching means is located between the negative pressure source P and the holes 9 and 10. The valve V serves to switch the pressure in the holes 9 and 10 between the negative pressure source P, the atmospheric pressure, and if necessary, a pressure higher than the atmospheric pressure.

As shown in FIG. 2, the center line of the first transportation table 2 that connects the center C1 of rotation of the table 2 and the suction port 7 in the work transfer section 6 is designated by Φ1. Further, the center line of the second transportation table 3 that connects the center C2 of rotation of the table 3 and the suction port 8 is designated by Φ2. The center line Φ2 of the second transportation table 3 is offset for a distance designated by y in FIG. 2 on the rear side of rotation of the table 3 with respect to the center line Φ1 of the first transportation table 2. These center lines Φ1 and Φ2 extend parallel to each other.

In the work transfer section 6, therefore, the respective positions of the work holders 4 and 5 are deviated from each other for the offset y and are not opposed to each other. Thus, the work holders 4 and 5 are situated symmetrically with respect to a point in the work transfer section 6.

Figure 3:
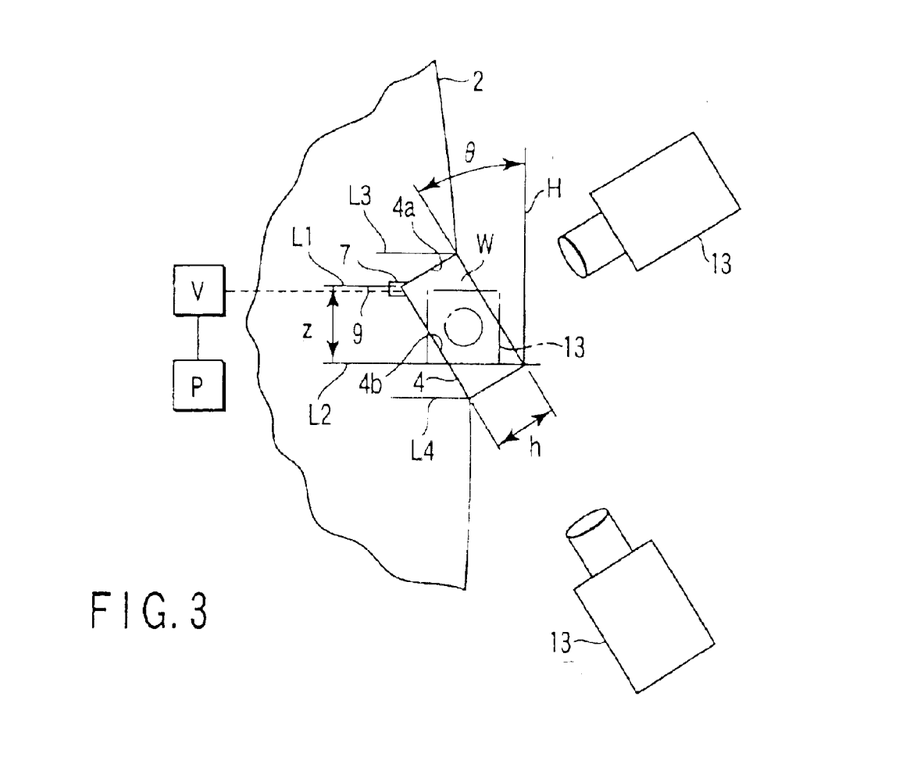
FIG. 3 is a plan view showing a work held in a work holder of the first transportation table of the work transferring and transporting apparatus shown in FIG. 1.

Preferably, the offset y should be equal at least to a dimension Z shown in FIG. 3. The dimension Z is a distance between two inner segments L1 and L2, out of four segments L1, L2, L3 and L4 that individually extend in the horizontal direction from the corner portions of the long sides of the work W that are inclined at the angle θ to a vertical line H.

As shown in FIG. 2, a space X between the first and second transportation tables 2 and 3 in the work transfer section 6 should preferably be equal to or a little shorter than the cosine (h cos θ) of each short side (dimension h in the width direction) of the work W.

The space X between the first and second transportation tables 2 and 3 in the work transfer section 6 also depends on the depth of the work holders 4 and 5. In short, it is necessary only that the work W be prevented from interfering with one of the work holders 4 and 5 when it is held in the other holder.

In the work transfer section 6, the respective work holders 4 and 5 of the first and second transportation tables 2 and 3 move in the same direction. More specifically, the rotating direction R1 of the first transportation table 2 that rotates around the center C1 and the rotating direction R2 of the second transportation table 3 that rotates around the center C2 are opposite to each other. For example, the short side 4a of each work holder 4 of the first transportation table 2 is located on the front side with respect to the rotating direction R1, and the short side 5a of each work holder 5 of the second transportation table 3 on the rear side.

Divided work supply means 11 is provided on a part of the outer peripheral edge of the first transportation table 2 so as to extend along a line tangent to the table 2. A first processor 12 is located in front of the divided work supply means 11 with respect to the rotating direction of the transportation table 2. It is used to check the work W for external appearance or measure its electrical properties. As shown in FIG. 3, the first processor 12 is provided with a plurality of cameras 13 that are used for external inspection of two or four surfaces of the work W.

A second processor 14 is provided on a part of the outer peripheral edge of the second transportation table 3. A work delivery section 15 for delivering the work W is located in front of the second processor 14 with respect to the rotating direction of the transportation table 3. The second processor 14, like the first processor 12, is provided with a plurality of cameras that are used for external inspection of four (or two) other surfaces of the work W. External appearance inspection of the surfaces of the works W that is complementary to the inspection in the first processor 12 is carried out in the second processor 14.

The following is a description of the operation of the work transferring and transporting apparatus 1.

The first and second transportation tables 2 and 3 continuously rotate in the directions indicated by arrows R1 and R2, respectively, in FIG. 1. In the respective suction ports 7 and 8 of the work holders 4 and 5, the atmosphere is sucked in through the suction holes 9 and 10 under the negative pressure that is generated by the negative pressure source P. In a region where no works W are held in the work holders 4 and 5, such as the work delivery section 15, atmospheric suction in the suction ports 7 and 8 is prevented by means of a switching mechanism (not shown).

When the work W is fed from the divided work supply means 11 to one of the work holders 4 of the first transportation table 2, it is sucked in by the suction port 7 of the work holder 4. A short side of the work W is held by means of the short side 4a of the work holder 4, and a long side of the work W by means of the long side 4b.

When the work W reaches the first processor 12 as the first transportation table 2 rotates in the direction of arrow R1, inspection of its external appearance or measurement of its electrical properties is carried out by means of the cameras 13. Those works W which are concluded to be defective or nonstandard by the first processor 12 are discharged by means of the processor 12. Only those works W which are concluded to be nondefective by the first processor 12 are transported to the work transfer section 6 as the first transportation table 2 rotates.

Figure 4A:
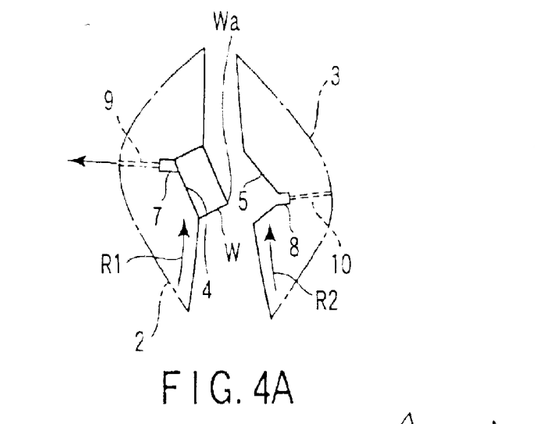
FIGS. 4A to 4C are partial plan views of the work transferring and transporting apparatus of FIG. 1 showing the way the work is transferred by means of the apparatus.
Figure 4B:
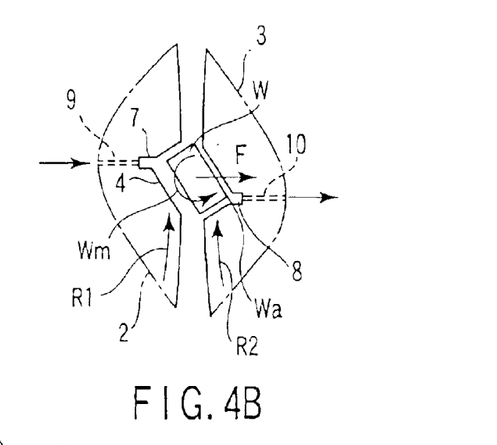
Figure 4C:
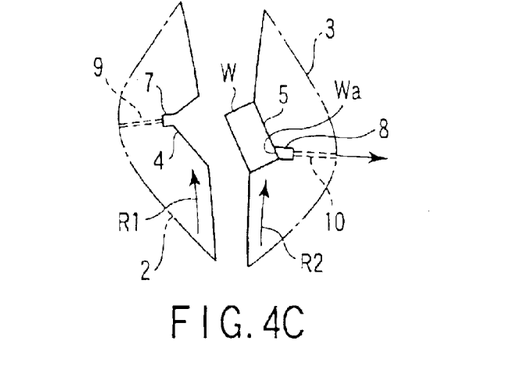

Referring now to FIGS. 4A to 4C, there will be described the way the work W is transferred from one of the work holders 4 of the first transportation table 2 to one of the work holders 5 of the second transportation table 3. FIG. 4A shows a state at the time immediately before the work W reaches the transfer section 6. In this state, the suction hole 9 communicates with the negative pressure source P (shown in FIG. 3), so that the area near the suction port 7 is kept under a negative pressure. This work W is held by means of the work holder 4.

When the selector valve V is then switched, the suction hole 9 of the work holder 4 is cut off from the negative pressure source P and exposed to the atmosphere in the work transfer section 6. Thereupon, the negative pressure in the suction port 7 suddenly approaches the atmospheric pressure, so that the work retention of the work holder 4 is canceled. If the rotational speed of the first transportation table 2 is relatively low, however, only exposing the suction hole 9 to the atmospheric pressure sometimes may fail to cancel the work retention. In this case, the work retention may be positively canceled by applying a positive pressure a little higher than the atmospheric pressure to the suction hole 9.

If the work retention of the work holder 4 is canceled, a centrifugal force F as shown in FIG. 4B, having so far been acting on the work W accompanying the rotation of the first transportation table 2, causes the work W to leave the holder 4. The centrifugal force F is given by $F=mr\omega^2$, where $m$ is the mass of the work W, $r$ is the distance from the center of the table 2 to the work W, and $\omega$ is the rotational angular velocity of the table 2.

The work W, having left the work holder 4 of the first transportation table 2, is transferred to the work holder 5 of the second transportation table 3 that rotates in synchronism with the table 2, as shown in FIG. 4C.

Since the first transportation table 2 is continuously rotating in the direction of arrow R1, a counterclockwise moment Wm, besides the centrifugal force F having been acting on the work W, acts on the work W, as shown in FIG. 4B. This is done because the work W is revolving on its own axis as well as around the first transportation table 2. When the work W leaves the table 2, therefore, it transfers to the work holder 5 of the second transportation table 3 while rotating in the counterclockwise direction (direction of the moment Wm).

When this is done, the area near the suction port 8 that is formed near the corner portion of the L-shaped work holder 5 of the second transportation table 3 is kept under a negative pressure, since the suction hole 10 is connected to the negative pressure source P. As shown in FIG. 4C, therefore, the work W having transferred to the work holder 5 is held by suction by means of the holder 5 and transported in the direction of arrow R2. Besides, the work W is transferred to the work holder 5 in a manner such that its corner portion Wa plunges into the suction port 8, as shown in FIGS. 4A, 4B and 4C. Thus, the work W can be transferred securely.

As the second transportation table 3 rotates continuously, the work W transferred to the work holder 5 of the table 3 is transported to the second processor 14. External appearance inspection that is complementary to the inspection in the first processor 12, e.g., external appearance inspection of the surfaces of the work W that are concealed by the two surfaces 4a and 4b of the work holder 4, is carried out in the second processor 14. Those works W which are concluded to be defective or nonstandard by the second processor 14 are discharged by means of the processor 14. Only those works W which are concluded to be nondefective are transported to the work delivery section 15.

In the work delivery section 15, the suction hole 10 of the work holder 5 is cut off from the negative pressure source P and exposed to the atmosphere. Thereupon, the pressure in the suction port 8 is suddenly equalized to the atmospheric pressure, so that the work retention of the work holder 5 is canceled. If necessary, a positive pressure a little higher than the atmospheric pressure may be applied to the interior of the suction hole 10. If the work retention of the work holder 5 is canceled, the work W is disengaged from the work holder 5 and delivered to the next stage.

As the first and second transportation tables 2 and 3 continuously rotate in this manner, the work W held in the work holder 4 of the first transportation table 2 reaches the work transfer section 6. When the work W reaches the transfer section 6, it is transferred to the work holder 5 of the second transportation table 3 and transported by means of the table 3. While the work W is being transported in this manner, inspection of its external appearance or measurement of its electrical properties is carried out.

Since the first transportation table 2 is continuously rotating, moreover, the moment Wm, as well as the centrifugal force F, acts on the work W in the work transfer section 6. The instant the corner portion Wa of the work W leaves the table 2, therefore, it slides into the suction port 8 of the second transportation table 3 while rotating in the direction of the moment Wm. Thus, the work W can be securely transferred from the first transportation table 2 to the second transportation table 3.

The electronic component chip having a rectangular plane shape has been described as an example of the work W in connection with the foregoing embodiment. However, the work is not limited to an electronic component, and may alternatively be a resin or metallic component having a square plane shape, for example. Instead of attracting the work to the work holder under a negative pressure, moreover, the work may be held in the work holder by means of a magnetic force or mechanical clamping force.

What is claimed is:

1. A work transferring and transporting apparatus, comprising:
    a first transportation table which has a plurality of work holders for holding works on the peripheral edge portion thereof and rotates continuously;
    a second transportation table which is located adjacent to and substantially flush with the first transportation table, has a plurality of work holders for holding the works on the peripheral edge portion thereof, and continuously rotates in synchronism with the first transportation table; and
    a work transfer section located between the first and second transportation tables, in which each work, held in one of the work holders of the first transportation table, is transferred to one of the work holders of the second transportation table and transported by means of the second transportation table wherein each work holder of the first transportation table is in the form of an L-shaped recess having surfaces capable of holding each work in a manner such that the work holder is inclined inside the transportation table at an angle greater than 0° and narrower than 45° to a line tangent to the trajectory of the transportation table on the front side with respect to the rotating direction.

2. A work transferring and transporting apparatus according to claim 1, wherein the first and second transportation tables transfer the works from the work holders of the first transportation table located on the upper-stream side with respect to the work transporting direction to the work holders of the second transportation table on the lower-stream side.

3. A work transferring and transporting apparatus according to claim 1, wherein the first and second transportation tables rotate in opposite directions around the centers of rotation thereof so that the respective work holders of the transportation tables move in the same direction in the work transfer section.

4. A work transferring and transporting apparatus according to claim 1, wherein each work holder of the second transportation table is in the form of an L-shaped recess having surfaces capable of holding each work in a manner such that the work holder is inclined inside the transportation table at an angle greater than 0° and narrower than 45° to a line tangent to the trajectory of the transportation table on the rear side with respect to the rotating direction.

5. A work transferring and transporting apparatus according to claim 1, wherein the respective work holders of the first and second transportation tables are situated symmetrically with respect to a point in the work transfer section.

6. A work transferring and transporting apparatus according to claim 1, wherein a suction port connected to a negative pressure source is formed in a corner portion of the L-shaped recess of each work holder of the first transportation table.

7. A work transferring and transporting apparatus according to claim 4, wherein a suction port connected to a negative pressure source is formed in a corner portion of the L-shaped recess of each work holder of the second transportation table.

8. A work transferring and transporting apparatus according to claim 1, wherein each work holder of the first transportation table is in the form of an L-shaped recess having surfaces capable of holding each work in a manner such that the work holder is inclined inside the transportation table at an angle greater than 0° and narrower than 45° to a line tangent to the trajectory of the transportation table on the front side with respect to the rotating direction, that each work holder of the second transportation table is in the form of an L-shaped recess having surfaces capable of holding each work in a manner such that the work holder is inclined inside the transportation table at the angle greater than 0° and narrower than 45° to a line tangent to the trajectory of the transportation table on the rear side with respect to the rotating direction, and that a line which connects the center of rotation of the first transportation table and a corner portion of the L-shaped recess of the work holder of the first transportation table and a line which connects the center of rotation of the second transportation table and a corner portion of the L-shaped recess of the work holder of the second transportation table are spaced and extend parallel to each other in the work transfer section.

9. A work transferring and transporting apparatus according to claim 1, wherein the respective work holders of the first and second transportation tables are formed individually having suction ports, the suction ports being connected with a negative pressure source, which generates a negative pressure lower than the atmospheric pressure, through switching means capable of switching pressure.

10. A work transferring and transporting apparatus according to claim 9, wherein the switching means is a selector valve which changes pressure between the atmospheric pressure and a negative pressure lower than the atmospheric pressure.

11. A work transferring and transporting apparatus according to claim 9, wherein the switching means is a selector valve which changes pressure between a negative pressure lower than the atmospheric pressure and a positive pressure higher than the atmospheric pressure.

12. A work transferring and transporting method comprising:

a step of attracting a work to a work holder on the peripheral edge portion of a rotating first transportation table under a negative pressure lower than the atmospheric pressure and transporting the work;

a step of canceling the negative pressure in the work holder of the first transportation table, thereby disengaging the work from the work holder of the first transportation table, in a work transfer section located between the first and second transportation tables; and a step of attracting the work disengaged from the first transportation table to the work holder of the second transportation table under a negative pressure lower than the atmospheric pressure, thereby transferring the work to the second transportation table, and transporting the work by means of the second transportation table.

13. A work transferring and transporting method according to claim 12, wherein the negative pressure in the work holder of the first transportation table is canceled to allow the work disengaged from the work holder to be transferred to the work holder of the second transportation table by means of a centrifugal force generated as the first transportation table rotates.

14. A work transferring and transporting method according to claim 12, wherein a positive pressure higher than the atmospheric pressure is applied to the work holder of the first transportation table when the work is disengaged from the work holder.

* * * * *